(12) United States Patent
Tao et al.

(10) Patent No.: US 7,943,271 B2
(45) Date of Patent: May 17, 2011

(54) ELECTROCHEMICAL DEVICE AND METHODS FOR ENERGY CONVERSION

(75) Inventors: Tao T. Tao, Hopkinton, MA (US); Wei Bai, Westborough, MA (US)

(73) Assignee: CellTech Power LLC, Westborough, MA (US)

( * ) Notice: Subject to any disclaimer, the term of this patent is extended or adjusted under 35 U.S.C. 154(b) by 0 days.

(21) Appl. No.: 12/625,881

(22) Filed: Nov. 25, 2009

(65) Prior Publication Data

US 2010/0136463 A1 Jun. 3, 2010

Related U.S. Application Data

(60) Continuation of application No. 10/627,330, filed on Jul. 25, 2003, now Pat. No. 7,678,484, which is a division of application No. 09/837,864, filed on Apr. 18, 2001, now abandoned.

(60) Provisional application No. 60/197,998, filed on Apr. 18, 2000.

(51) Int. Cl.
*H01M 4/02* (2006.01)
*H01M 8/00* (2006.01)
(52) U.S. Cl. ........................... 429/523; 429/400
(58) Field of Classification Search ............... None
See application file for complete search history.

(56) References Cited

U.S. PATENT DOCUMENTS

| 460,122 A | 9/1891 | Edison |
|---|---|---|
| 3,138,490 A | 6/1964 | Tragert et al. |
| 3,432,352 A | 3/1969 | White et al. |
| 3,741,809 A | 6/1973 | Anbar |
| 3,953,227 A | 4/1976 | Jones et al. |
| 3,970,474 A | 7/1976 | Anbar et al. |
| 3,982,957 A | 9/1976 | Jones et al. |
| 4,042,755 A | 8/1977 | Anbar |
| 4,170,534 A | 10/1979 | Fitterer |
| 4,551,400 A | 11/1985 | Sapru et al. |

(Continued)

FOREIGN PATENT DOCUMENTS

DE 367151 1/1923

(Continued)

OTHER PUBLICATIONS

Alberty, R.A., "Electrochemical Cells Fuel Cells," *Physical Chemistry*(6th Ed.), pp. 228-229 (1983).

(Continued)

*Primary Examiner* — Dah-Wei Yuan
*Assistant Examiner* — Angela J. Martin
(74) *Attorney, Agent, or Firm* — Wolf, Greenfield & Sacks, P.C.

(57) ABSTRACT

The present invention relates to an electrochemical device. The device features an anode constructed of materials such that the device can be chemically recharged. In addition, the device is capable of switching between operating as a fuel cell or as a battery. The switch can occur without cessation of electrical output. In certain aspects of the invention, the device is capable of operating at a temperature of less than 1000° C. Other aspects feature a liquid anode which allows higher output, dispersion of fuel and minimal stresses in an interface comprising the anode. Preferably the anode is a liquid at a temperature of less than 1000° C. The invention also relates to methods for energy conversion in which a continual electrical output can be produced in both the presence of fuel without anode consumption or the absence of fuel.

14 Claims, 6 Drawing Sheets

U.S. PATENT DOCUMENTS

| | | | |
|---|---|---|---|
| 4,670,702 A | 6/1987 | Yamada et al. |
| 4,702,971 A | 10/1987 | Isenberg |
| 4,824,739 A | 4/1989 | Breault et al. |
| 4,826,740 A | 5/1989 | Costa |
| 4,853,094 A | 8/1989 | Honders et al. |
| 4,883,724 A | 11/1989 | Yamamoto |
| 4,894,297 A | 1/1990 | Singh et al. |
| 4,973,531 A | 11/1990 | Zaima et al. |
| 5,035,962 A | 7/1991 | Jensen |
| 5,045,170 A | 9/1991 | Bullock et al. |
| 5,139,895 A | 8/1992 | Roy et al. |
| 5,209,989 A | 5/1993 | Ishihara et al. |
| 5,290,323 A | 3/1994 | Okuyama et al. |
| 5,298,340 A | 3/1994 | Cocks et al. |
| 5,312,699 A | 5/1994 | Yanagi et al. |
| 5,316,870 A | 5/1994 | Ohga |
| 5,348,812 A | 9/1994 | Cocks et al. |
| 5,350,641 A | 9/1994 | Mogensen et al. |
| 5,376,469 A | 12/1994 | Gur et al. |
| 5,455,127 A | 10/1995 | Olsen et al. |
| 5,523,177 A | 6/1996 | Kosek et al. |
| 5,532,078 A | 7/1996 | Redey et al. |
| 5,558,947 A | 9/1996 | Robison |
| 5,567,540 A | 10/1996 | Stone et al. |
| 5,589,287 A | 12/1996 | Hatoh et al. |
| 5,589,289 A | 12/1996 | Zhang et al. |
| 5,591,537 A | 1/1997 | Bagger et al. |
| 5,595,832 A | 1/1997 | Tomimatsu et al. |
| 5,601,945 A | 2/1997 | Clough |
| 5,604,048 A | 2/1997 | Nishihara et al. |
| 5,637,414 A | 6/1997 | Inoue et al. |
| 5,747,185 A | 5/1998 | Hsu |
| 5,750,278 A | 5/1998 | Gillett et al. |
| 5,766,786 A | 6/1998 | Fleck et al. |
| 5,866,090 A | 2/1999 | Nakagawa et al. |
| 5,942,349 A | 8/1999 | Badwal et al. |
| 5,985,474 A | 11/1999 | Chen et al. |
| 6,096,449 A | 8/2000 | Fuglevand et al. |
| 6,120,926 A | 9/2000 | Szydlowski et al. |
| 6,120,933 A * | 9/2000 | Phelps ......................... 429/103 |
| 6,127,057 A | 10/2000 | Gorman |
| 6,162,554 A | 12/2000 | Nolscher et al. |
| 6,200,697 B1 | 3/2001 | Pesavento |
| 6,221,522 B1 | 4/2001 | Zafred et al. |
| 6,242,120 B1 | 6/2001 | Herron |
| 6,265,093 B1 | 7/2001 | Surampudi et al. |
| 6,300,011 B1 | 10/2001 | Lin et al. |
| 6,348,278 B1 | 2/2002 | LaPierre et al. |
| 6,379,485 B1 | 4/2002 | Borglum |
| 6,379,844 B1 * | 4/2002 | Redey et al. ............... 429/231.9 |
| 6,383,678 B1 | 5/2002 | Kaneko et al. |
| 6,403,246 B1 | 6/2002 | Mizuno et al. |
| 6,461,751 B1 | 10/2002 | Boehm et al. |
| 6,587,766 B2 | 7/2003 | Bruckner |
| 6,599,662 B1 | 7/2003 | Chiang et al. |
| 6,641,944 B2 | 11/2003 | Kawasumi et al. |
| 6,692,861 B2 | 2/2004 | Tao |
| 6,827,832 B2 | 12/2004 | Henuset et al. |
| 6,890,672 B2 | 5/2005 | Dickman et al. |
| 7,678,484 B2 | 3/2010 | Tao et al. |
| 2002/0015871 A1 | 2/2002 | Tao et al. |
| 2002/0015877 A1 | 2/2002 | Tao |
| 2002/0051900 A1 | 5/2002 | Okamoto et al. |
| 2002/0114990 A1 | 8/2002 | Fly et al. |
| 2003/0143440 A1 | 7/2003 | Tao et al. |
| 2004/0058203 A1 | 3/2004 | Priestnall et al. |
| 2004/0166398 A1 | 8/2004 | Tao |
| 2004/0202924 A1 | 10/2004 | Tao et al. |
| 2004/0251241 A1 | 12/2004 | Blutke et al. |
| 2005/0089738 A1 | 4/2005 | Tao et al. |
| 2006/0040167 A1 | 2/2006 | Blake et al. |
| 2007/0048555 A1 | 3/2007 | Blake et al. |

FOREIGN PATENT DOCUMENTS

| | | |
|---|---|---|
| DE | 2650960 A1 | 5/1977 |
| DE | 4004220 C1 * | 4/1981 |
| DE | 4004220 C1 | 4/1991 |
| DE | 19946695 A1 | 4/2000 |
| DE | 19961496 A1 | 7/2000 |
| EP | 0001351 A1 | 4/1979 |
| EP | 0333261 A2 | 9/1989 |
| EP | 0817297 A2 | 1/1998 |
| EP | 1132986 A2 | 9/2001 |
| EP | 1148566 A2 | 10/2001 |
| FR | 2020742 | 7/1970 |
| FR | 2207365 | 6/1974 |
| GB | 126766 | 5/1919 |
| GB | 940900 | 11/1963 |
| GB | 1276260 | 6/1972 |
| GB | 2278010 A | 11/1994 |
| JP | 08-96826 | 2/1985 |
| JP | 60-32254 | 4/1996 |
| WO | 90/02425 A1 | 3/1990 |
| WO | 95/09450 A1 | 4/1995 |
| WO | 00/77872 A1 | 12/2000 |
| WO | 01/28019 A2 | 4/2001 |
| WO | 01/97314 A1 | 12/2001 |
| WO | 03/001617 A2 | 1/2003 |
| WO | 03/044887 A2 | 5/2003 |
| WO | 03/067683 A2 | 8/2003 |
| WO | 2004/112175 A2 | 12/2004 |

OTHER PUBLICATIONS

Grant Abstract, "Novel Carbon Ion Fuel Cells," P/METC-DE-FG22-93PC93219, Duke Univ.

Grant Abstract, "Novel Carbon Ion Fuel Cells," P/PETC-FG22-93PC93219, Duke Univ.

Gur et al., "Direct Electrochemical Conversion of Carbon to Electrical Energy in a High Temperature Fuel Cell," *J. Electrochem.*, vol. 139, No. 10 pp. L95-L97 (1992).

Lu et al., "Development of solid oxide fuel cells for the direct oxidation of hydrocarbon fuels," *Solid State Ionics*, vol. 152, pp. 383-397 (2002).

Yentekakis et al., "A Novel Fused Metal Anode Solid Electrolyte Fuel Cell for Direct Coal Gasification: A Steady-State Model," *Ind. Eng. Chem. Res.*, vol. 28, pp. 1414-1424 (1989).

Weaver et al., "Direct use of coal in a fuel cell: feasibility investigation," *Chemical Abstracts*, 180031, vol. 85, No. 24, p. 146.

* cited by examiner

ELECTROCHEMICAL DEVICE AND METHODS FOR ENERGY CONVERSION

RELATED APPLICATION

This application is a continuation of U.S. application Ser. No. 10/627,330, filed Jul. 25, 2003, by Tao T. Tao et al., which is a divisional of U.S. application Ser. No. 09/837,864, filed Apr. 18, 2001, by Tao T. Tao et al., which claims the benefit under Title 35 U.S.C. §119(e) of co-pending U.S. provisional application Ser. No. 60/197,998, filed Apr. 18, 2000, by Tao T. Tao et al., each of which is incorporated herein by reference.

FIELD OF INVENTION

The present invention relates to an electrochemical device that can operate either as a fuel cell or a battery. The device features a chemically rechargeable anode, particularly where the anode comprises a liquid such as a metal or a metal alloy. Methods for generating electricity in the presence or absence of a fuel are also disclosed.

BACKGROUND OF THE INVENTION

In a fuel cell comprising a solid oxide, a cathode reduces oxygen to oxygen ions and an anode oxidizes a fuel accompanied by a release of electrons provided by the fuel. The oxidized fuel combines with the oxygen ions to counteract a resulting flow of released electrons through an external circuit. The anode is not consumed during operation of the fuel cell. Theoretically, the fuel cell can operate as long as fuel is supplied to the anode.

Electrical output depends on several factors, including the type of fuel used and the operational temperature, as well as the electrode and electrolyte components. To provide a high electrical output, new materials have been devised that can withstand high operational temperatures. Such high temperatures may not be practical for many applications, however. In addition, a combination of currently known materials results in a heavy device, which is not practical for variable load applications. Attempts to improve the performance of fuel cells include the discovery of new materials for anode, electrolyte and cathode components. Each device, however, is generally specific for a certain type of fuel.

In a metal/air battery, a cathode reduces oxygen to oxygen ions in a similar manner to a fuel cell, but the anode itself oxidizes and provides electrons which are released to an external circuit. Thus, the anode is consumed. For charge balance, the oxidized anode reacts with oxygen ions produced by the cathode. The battery does not require fuel in order to generate electricity. The battery, however, has only a defined lifetime as determined by the lifetime of the anode.

Attempts have been made to combine the attributes of a fuel cell and a battery. For example, a device may comprise separate battery and fuel cell components, thus combining the storage capacity of a battery with the longevity of fuel cells. This arrangement, however, only adds to the weight of the device.

Much effort has been made, and continues to be made, to improve the performance of fuel cells and batteries, particularly for mobile applications where lightweight components and increased power output are essential.

SUMMARY OF THE INVENTION

One aspect of the present invention provides an electrochemical device. The device comprises an anode constructed of a material such that the anode is a chemically rechargeable anode. The device also comprises a source of fuel exposable to the anode.

Another aspect of the present invention provides an anode being constructed of a material such that the anode is a chemically rechargeable anode.

Another aspect of the present invention provides an electrochemical device comprising an anode comprising a liquid. The device is operable at a temperature of no more than 1,000° C. The device also comprises a source of a fuel exposable to the anode.

Another aspect of the present invention provides an electrochemical device comprising an anode and an intermittent fuel source deliverable to the anode to produce a continuous electrical output from the device.

Another aspect of the present invention provides an electrochemical device comprising an anode and a source of a fuel exposable to the anode. The anode is constructed of a material such that the device is capable of producing electricity by using the anode in both the presence of the fuel without anode consumption, and in the absence of the fuel.

Another aspect of the present invention provides an electrochemical device, comprising a liquid anode comprising an alloy. Each metal in the alloy comprises a standard reduction potential greater than −0.70 V versus the Standard Hydrogen Electrode.

Another aspect of the present invention provides a stack of electrochemical devices. The stack comprises a first and second electrochemical device. Each device includes an anode comprising a liquid. The anode is in ionic communication with an electrolyte and the electrolyte is in ionic communication with the cathode. The stack comprises an interconnect positioned intermediate and adjacent both the anode of the first device and the cathode of the second device.

Another aspect of the present invention provides a method for energy conversion. The method comprises providing an electrochemical device comprising an anode. The method also involves causing electricity to be produced in the presence of a fuel provided to the anode without anode consumption. The method further comprises causing electricity to be produced in the device in the absence of the fuel provided to the anode.

Another aspect to the present invention provides a method for energy conversion comprising providing an anode and delivering a fuel to the anode intermittently while producing a continuous electrical output by using the anode.

Another aspect to the present invention provides a method comprising the steps of providing an anode and causing a portion of the anode to be oxidized such that electricity is produced. The method further comprises exposing the oxidized portion of the anode to a chemical reductant to reduce the oxidized portion.

Another aspect of the present invention provides an electrochemical device comprising a battery comprising an anode and a fuel cell comprising the anode. The fuel is exposable to the anode and comprises a material different from the anode.

Another aspect of the present invention provides a method for energy conversion, comprising the steps of providing a battery and supplying a fuel to an anode in the battery. The fuel is of a different material than that of the anode.

Another aspect of the present invention provides a method for energy conversion comprising the steps of providing a fuel cell and switching the fuel cell to a battery by ceasing a supply of a fuel to an anode in the fuel cell.

Another aspect of the present invention provides an electrochemical device comprising at least two fuel sources for supplying at least two different types of fuel to the device, the two fuel sources being interchangeable to allow selection of a type of fuel.

Another aspect of the present invention provides a solid-state electrolyte material, the housing containing a liquid anode.

Another aspect of the present invention provides a method for energy conversion. The method comprises the steps of providing a device comprising a liquid metal anode and oxidizing a portion of the anode to form a metal oxide concurrent with the generation of electricity.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION

Figure 1:
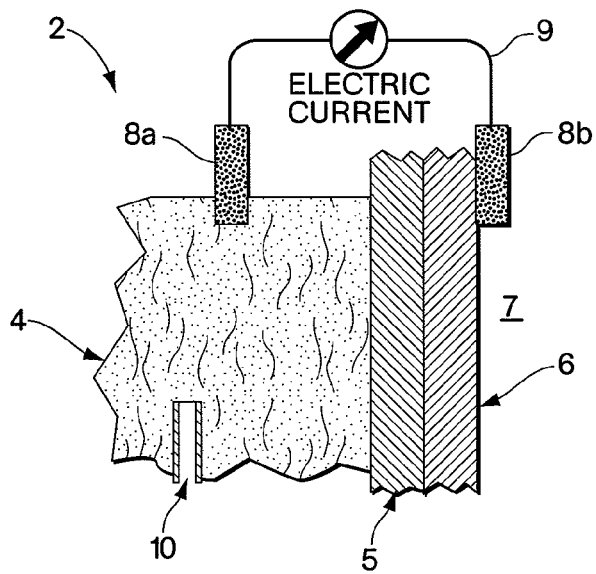
FIG. 1 shows a cross-sectional schematic diagram of a device of the present invention, highlighting the electrode and electrolyte components.

The present invention provides new electrochemical devices that display at least one or any combination of the following advantageous features: (1) a capability for chemical recharging; (2) simplified construction; (3) increased electrical output; and (4) a capability for providing a stack of electrochemical devices that afford low mechanical and thermal stresses. Certain aspects of the invention exploit the construction of an anodic material in conjunction with the use of different fuel types. The various embodiments of the present invention also provides novel methods for the generation of electricity.

One aspect of the present invention provides an electrochemical device. In one embodiment, electrochemical devices of the present invention are capable of converting chemical energy, via an electrochemical reaction, into electrical energy to produce an electrical output. Examples of electrochemical devices include a fuel cell and a battery. Other examples include an oxygen purifier and an oxygen sensor.

In one embodiment, the electrochemical device has a dual-mode capability in that the device can operate both as a fuel cell and as a battery. Thus, not only is the anode capable of oxidizing a fuel source and releasing electrons (e.g., as in a fuel cell), but the anode itself is capable of being oxidized with the release of electrons (e.g., as in a battery).

An advantage of this dual-mode capability can be illustrated by the following scenario. A typical prior art fuel cell can produce power so long as there is a supply of fuel. When the fuel supply is exhausted, the electrical output ceases almost instantaneously. This situation can be disastrous especially when a fuel cell device is being used for variable load applications in which replacement fuel is not immediately available. To circumvent this problem, certain prior art fuel cell devices have been provided with a battery back-up. The addition of a separate battery, however, adds weight and complexity to the fuel cell device, which is undesirable especially for variable load applications.

The use of batteries as a sole source of power also has its disadvantages. In a typical battery, electrical power is generated at the expense of anode consumption, as the anode is consumed to release electrons. This anode consumption causes batteries to have a defined lifetime which is dictated, in large part, by the lifetime of the anode. To circumvent this problem, certain prior art electrically rechargeable batteries have been developed in which an input of electrons from an outside source reduces the consumed anode and restores the anode to its initial state. However, an external power source is required for electric recharging.

In contrast, the device of the present invention is capable of switching between "battery mode" and "fuel cell mode." For example, if the fuel supply is exhausted, the device can continue to generate electricity while operating in battery mode thereby eliminating the need for an external battery back-up. Furthermore, when the fuel supply is replenished the device in battery mode can switch back to fuel cell mode if so desired. These features will be discussed more fully below.

Another aspect of the invention provides an electrochemical device which comprises an anode constructed of a material such that the anode is a chemically rechargeable anode.

A "chemically rechargeable anode" refers to an anode capable of being recharged by the addition of a chemical reductant, as opposed to conventional electrically rechargeable devices. A "chemically rechargeable device" as used herein refers to a device comprising a chemically rechargeable anode. Prior to operation, the device of this aspect of the invention provides an anode having an initial oxidation state. When the device is operated in battery mode, at least a portion of the anode is consumed and electrons are released. A "consumed" anode or portion of the anode refers to an anode having a higher oxidation state than the initial oxidation state i.e., the anode is oxidized. Chemical recharging can be initiated by exposing the portion of the consumed anode to a chemical reductant resulting in that portion being reduced to a more reduced state, such as the initial oxidation state. Thus, it is the chemical reductant, not electricity (as in prior art devices), that, at least in part, recharges the anode. In one embodiment, the chemical reductant alone causes recharging of the anode. In another embodiment, a combination of chemical and electrical recharging results in restoration of the anode. An advantage of chemical recharging is the provision of the recharging species, (i.e., the chemical) located within the device itself. Thus no external recharging species is needed. This feature is particularly desired for use in areas where electrical power sources for electrical recharging may not be readily available.

Certain metal anodes are capable of existing in more than two oxidation states or in non-integral oxidation states. A metal or alloy comprises metals having a neutral charge. Certain metals can be oxidized to one or more oxidation states, any one of these states being of a sufficient electrochemical potential to oxidize the fuel. Conversely, if that metal is oxidized to its highest oxidation state, it can be reduced to more than one lower oxidation state (at least one having a higher oxidation state than neutral) where the anode is capable of functioning in any of these states. Alternatively, a metal oxide or mixed metal oxide may collectively oxidize fuel where metal ions are reduced by formal non-integer values.

In one embodiment, the chemical reductant is the fuel itself. An advantage of this embodiment can be illustrated with the previous scenario, in which the device is operating in battery mode. Upon depletion of the anode, the device can convert back to fuel cell mode where the fuel is consumed to produce electricity. In addition, the fuel can chemically recharge the oxidized anode to its initial state via a chemical reaction. A portion of the fuel reduces the anode and another portion of the fuel is oxidized to generate electricity. When the anode is restored (or a portion restored) to a reduced state, such as its initial state, the device regains its internal "battery back-up" for future emergency situations. The use of the fuel itself as a recharging source provides another advantage in that the device automatically contains the recharging source, thus eliminating the need to store additional chemicals into the device. In other embodiment, however, it may be desired to incorporate another chemical reductant specifically for recharging the anode and having sufficient electrochemical activity to carry out this function.

In one embodiment, the chemically rechargeable device can be configured to allow recharging with electricity in addition to the chemical recharging capability. For certain anode materials and certain fuel types, it may be more feasible to recharge electrically if such an electrical power supply is readily available. For mobile applications, it is preferred that the anode is chemically rechargeable as well for the reasons described previously, e.g. eliminate need to carry a separate battery back-up for a lighter device.

In one embodiment, the anode comprises a liquid, preferably at temperatures for which the device is operable. A liquid is a material which exhibits flow properties. In one embodiment, a liquid is a material which exhibits a tendency to flow in response to an applied force under given operating conditions of temperature and pressure. Liquids generally have little or no tendency to spontaneously disperse. Preferably, materials which flow within a time scale that is not visually perceptible by the human eye are generally excluded from this definition.

One advantageous feature of a liquid anode is that fuel can be dispersed throughout the anode regardless of the physical state of the fuel, i.e., a gaseous, liquid or solid fuel can be dispersed throughout the anode. It is known that electrical output can be increased by increasing the surface area of an anode. Dispersing fuel throughout the anode allows maximization of the surface area exposed to the fuel. In addition, the liquid can be agitated by stirring or bubbling (or any other agitation methods) to help disperse the fuel throughout the liquid. In one embodiment, agitating the anode has further advantages where the anode undergoes oxide formation when consumed. The oxidized portion of the anode can be displaced with agitation to expose the unoxidized anode portions to the fuel. In contrast, a solid anode would form an oxidized portion at the anode/fuel interface, and the oxidized portion may block the fuel from accessing the anode. Additionally, a liquid anode reduces a need to machine the anode, as the anode can conform to any shape of casing used to house the device components. Where the electrolyte is a solid state electrolyte, the anode can conform to the shape of the electrolyte, maximizing the surface area of contact between the anode and the electrolyte.

In one embodiment, the device is operable, with the anode in a liquid state, at a temperature of less than about 1500° C., preferably at a temperature of less than about 1300° C., more preferably less than about 1200° C., even more preferably less than about 1000° C., and even more preferably less than about 800° C. By "operable", it is meant that the device is able to generate electricity, either as a fuel cell or as a battery with the anode in a liquid state, and the anode may not necessarily be a liquid at room temperature. It is understood by those of ordinary skill in the art that anodic temperature can be controlled by selection of anode materials or in the case of an alloy, composition and percentages of the respective metal components, i.e., composition can affect a melting point of the anode. Other exemplary operating temperature ranges include a temperature between about 300° C. to about 1500° C., between about 500° C. to about 1300° C., between about 500° C. to about 1200° C., between about 500° C. to about 1000° C., between about 600° C. to about 1000° C., between about 700° C. to about 1000° C., between about 800° C. to about 1000° C., between about 500° C. to about 900° C., between about 500° C. to about 800° C., and between about 600° C. to about 800° C.

In one embodiment, the device is operable at a temperature at which any of the solid state components (e.g. a cathode or electrolyte) are not easily susceptible to cracking, i.e., the solid state components should maintain their structural integrity at the operating temperature of the device. In another embodiment, the device is operable at a temperature at which the cathode does not react with the electrolyte. In another embodiment, the device is operable at a temperature at which the anode comprises a liquid. One or any combination of these factors can be practiced independently or in combination, and those of ordinary skill in the art can balance these factors with the knowledge that increasing operational temperatures generally result in an increase in electrical output.

In one embodiment, the anode can be a pure liquid or can have solid and liquid components, so long as the anode as a whole exhibits liquid-like properties.

In one embodiment, the anode comprises a metal. The metal can be a pure metal or can comprise an alloy comprising two or more metals. Upon consumption of a portion of the anode, the portion of the anode is oxidized to form a metal oxide. A mixed metal oxide can be formed in the case where the anode is an alloy. In one embodiment, the metal has a standard reduction potential greater than −0.70 V versus the Standard Hydrogen Electrode (determined at room temperature). These values can be obtained from standard reference materials or measured by using methods known to those of ordinary skill in the art. In another embodiment, where the anode comprises more than one metal, all metals preferably have a standard reduction potential greater than −0.70V versus the Standard Hydrogen Electrode. Balancing the various electrochemical potential requirements can be determined by those of ordinary skill in the art. In certain embodiments, an alloy can be used where at least one of the metals does not have a standard reduction potential greater than −0.70V, but is included in the alloy to enhance flow properties, consistency, or other properties not related to electrochemical potential. In other embodiments, the anode can comprise a mixture of a metal and non-metals to enhance flow properties, consistency, or other properties not related to electrochemical potential.

In one embodiment, the anode comprises a conducting polymer. Typical conducting polymers have a conjugated n-system extending throughout a substantial portion of the polymer backbone. Because of this conjugation, conducting polymers can be reduced or oxidized many times over, creating radicals which can be delocalized over at least a portion of the backbone. Conducting polymers can comprise organic components, or a mixture of organic and metal components. In the latter situation, the metals can themselves be oxidized or reduced. Preferably, the conducting polymer anode is a liquid at the operating temperatures disclosed herein. Examples of conducting polymers can be found in the "Desk Reference of Functional Polymers," R. Arshady Ed., American Chemical Society, Washington, D.C. (1997) in which the portions relating to conducting polymers are incorporated herein.

In one embodiment, the anode comprises a conducting ceramic, preferably one that is molten at any of the operating temperatures disclosed herein.

In one embodiment, where the fuel is used to chemically recharge the anode, the oxidation potential of the fuel can dictate the anode composition, i.e., the oxidized state of the anode is of a sufficient electrochemical potential to oxidize the fuel.

In one embodiment, the anode is chemically rechargeable from the oxidized state. For example, where the oxidized state is a metal oxide or mixed metal oxide, the chemical recharging results in restoration (i.e. reduction) of the anode back to being a metal or metal alloy. In another embodiment, the chemical recharging results in reduction of the anode to an oxidation state capable of oxidizing the fuel.

In one embodiment, the anode comprises a metal or alloy comprising at least one of a transition metal, a main group metal, an alkaline metal, an alkaline earth metal, a lanthanide, an actinide and combinations thereof. In another embodiment, the anode comprises material such as copper, molybdenum, mercury, iridium, palladium, antimony, rhenium, bismuth, platinum, silver, arsenic, rhodium, tellurium, selenium, osmium, gold, lead, germanium, tin, indium, thallium, cadmium, gadolinium, chromium nickel, iron, tungsten, cobalt, zinc, vanadium or combinations thereof. For example, the anode can comprise a pure metal such as antimony, indium, tin, bismuth, mercury and lead. In another embodiment, the anode comprises an alloy of at least one element such as copper, molybdenum, mercury, iridium, palladium, antimony, rhenium, bismuth, platinum, silver, arsenic, rhodium, tellurium, selenium, osmium, gold, lead, germanium, tin, indium, thallium, cadmium, gadolinium, chromium nickel, iron, tungsten, vanadium, manganese, cobalt, zinc and combinations thereof. Examples of alloys include 5% lead with reminder antimony, 5% platinum with reminder antimony, 5% copper with reminder indium, 20% lead, 10% silver, 40% indium, 5% copper.

In one aspect of the invention, the anode comprises a material that is different from the fuel composition, thus distinguishing the devices of the present invention from metal/air batteries. Metal/air batteries are sometimes referred to as "fuel cells" because the lifetime of metal/air batteries can be increased by adding more anodic material. These batteries, however, do not provide the benefits of the devices of the present invention, as described herein. In one embodiment, the invention provides a method for energy conversion comprising the step of providing a battery and supplying a fuel to an anode in the battery. The fuel is of a different material than the anode material. This embodiment allows the device to operate as a fuel cell and a battery. With other batteries, supplying a fuel that is of a different material than the anode material is an irrelevant step and serves no function.

In one aspect of the invention, the device comprises a source of fuel exposable to the anode. "Exposable to the anode" refers to a capability for delivering fuel to the anode. For example, the fuel can be added directly to the anode. Alternatively, the fuel can be contained in a reservoir and can be deliverable to the anode, when needed, via a conduit leading from the reservoir to the anode. When the device is operating in battery mode, the fuel source can be shut off but remains exposable or capable of being exposed to the anode at a later time when fuel cell mode is desired. Alternatively, the fuel can be in contact with the anode, i.e. dispersed throughout the anode, positioned on a surface of the anode or otherwise contacted with the anode during operation and/or storage. In other embodiments, where the anode is a metal, the fuel can be in contact with metal oxide formed from the anode. The anode can be supplied with a new charge of fuel either continuously or periodically. This may be one viable arrangement for solid fuels. Depending on the physical state of the fuel (i.e., solid, liquid or gas), and other physical properties (powder, viscous liquid, etc.), those of ordinary skill in the art can readily construct a delivery mechanism to expose the fuel to the anode.

Examples of classes of fuels include a carbonaceous material; sulfur; a sulfur-containing organic compound such as thiophene, thiourea and thiophenol; a nitrogen-containing organic compound such as nylon and a protein; ammonia, hydrogen and mixtures thereof. Typically, the fuel selected for the device is mission dependent.

Examples of a fuel comprising a carbonaceous material include conductive carbon, graphite, quasi-graphite, coal, coke, charcoal, fullerene, buckminsterfullerene, carbon black, activated carbon, decolorizing carbon, a hydrocarbon, an oxygen-containing hydrocarbon, carbon monoxide, fats, oils, a wood product, a biomass and combinations thereof. Examples of a hydrocarbon fuel include saturated and unsaturated hydrocarbons, aliphatics, alicyclics, aromatics, and mixtures thereof. Other examples of a hydrocarbon fuel include gasoline, diesel, kerosene, methane, propane, butane, natural gas and mixtures thereof. Examples of oxygen-containing hydrocarbon fuels include alcohols which further include $C_1$-$C_{20}$ alcohols and combinations thereof. Specific examples include methanol, ethanol, propanol, butanol and mixtures thereof. However, almost all oxygen-containing hydrocarbon fuels capable of being oxidized by the anode materials disclosed herein can be used so long as the fuel is not explosive or does not present any danger at operating temperatures.

Gaseous fuels such as hydrogen and SynGas (a mixture of hydrogen and carbon monoxide) can also be used in certain embodiments of the invention.

In another aspect of the invention, the electrochemical device is capable of operating with more than one type of fuel. The vast majority of prior art fuel cells are designed to operate with a specific fuel type, usually hydrogen and less often methanol. This aspect of the invention makes it possible to capitalize on the benefits of different fuel types. For example, one type of fuel may provide a higher power output whereas another may provide a lower power output but affords lightweight properties. Enhanced performance may be achieved with one type of fuel, yet another type of fuel recharges the anode more efficiently. Other benefits for using different fuel types may be realized, for example, in situations where the price of one fuel type rises and economics dictate the use of a cheaper fuel. Environmental concerns may also be a deciding factor in changing the fuel type. Short term benefits may be realized, for example, in the situation where the supply of one fuel type is exhausted and only another fuel type is readily available.

In one embodiment, the device comprises a variable source of fuel for at least two different fuels. For example, the source of fuel can comprise at least two different reservoirs for two or more different fuels. Each fuel type can be accessed on demand individually, or in combination. In another embodiment, the source of fuel is capable of being interchanged with a different source of fuel. For example, an electrochemical device running on a gaseous fuel can run with a solid carbonaceous fuel dispersed throughout the anode. Those of ordinary skill in the art can readily devise a device comprising various delivery mechanisms.

Figure 2:
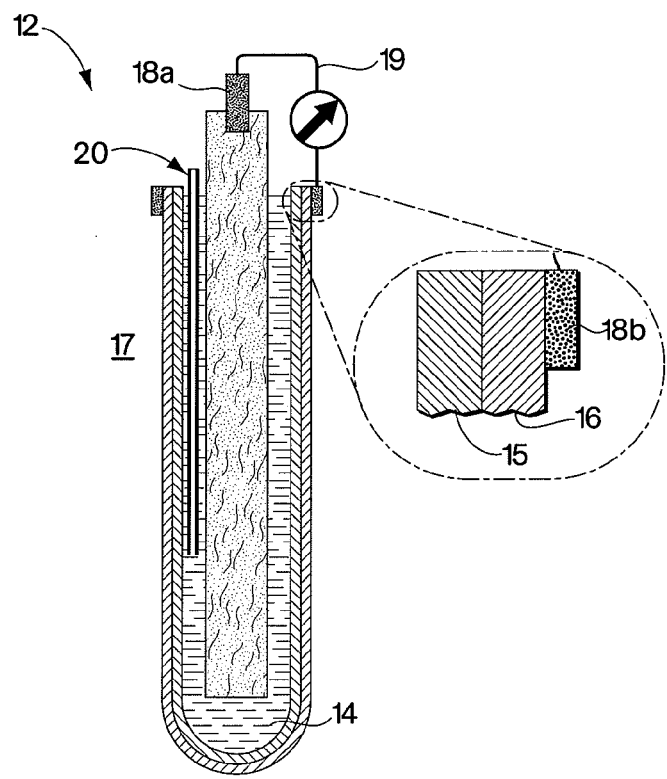
FIG. 2 shows a cross-sectional schematic diagram of a tubular device of the present invention, highlighting the electrode and electrolyte components.

Examples of electrochemical devices of the invention are illustrated in FIGS. 1 and 2. FIG. 1 shows a cross-sectional schematic diagram of electrochemical device 2 having anode 4 in ionic communication with electrolyte 5. "Ionic communication" refers to a positioning and/or interconnecting of an electrode to an electrolyte to allow ions to migrate between the electrode and electrolyte. When anode 4 is in ionic communication with electrolyte 5, negative ions can migrate from electrolyte 5 to anode 4. An alternative arrangement (not shown here) can be provided where anode 4 is in ionic communication with electrolyte 5 even with an intervening layer of another material disposed between and contacting anode 4 and electrolyte 5. For example, a layer of a catalyst can be used as the intervening layer to increase the reaction rate between the oxidized fuel and oxygen anions. Electrolyte 5 is also in ionic communication with cathode 6 to allow negatively charged ions to migrate from cathode 6 to electrolyte 5. In the specific embodiment shown in FIG. 1, the electrodes (anode 4 and cathode 6) and electrolyte 5 are shown as solid-state layers in which electrolyte layer 5 is disposed between and contacting anode layer 4 and cathode layer 6.

Leads (or current collectors) 8a and 8b are in electronic communication with anode 4 and cathode 6 respectively. "Electronic communication" refers to any pathway which provides for the transport of electricity. The electrochemical circuit is completed with external circuit 9 which electrically connect leads 8a and 8b. Circuit 9 is typically a metal wire or any material capable of conducting electricity. In one embodiment, lead 8a can comprise graphite and can serve the double function of collecting current and providing a fuel if at least partially submersed in anode 4.

Inlet 10 is a conduit for introducing fuel to the anode. Inlet 10 can be positioned, at least in part, within anode 4 to disperse fuel throughout the anode efficiently. Alternatively, inlet 10 does not have to contact anode 4 but can be positioned at a minimally close distance to allow all the fuel released through inlet 10 to contact anode 4. Inlet 10 can be further connected to a reservoir (not shown) that comprises a source of fuel with or without the use of a conduit. A variety of reservoirs have been or can be developed for the delivery of solid, gaseous or liquid fuel. For example, the reservoir can comprise a pressurized tank of gaseous or liquid fuel. It is not necessary to provide liquid fuels in pressurized form although pressurization advantageously compacts the fuel volume. Solid fuel can be provided as a powder or other deliverable forms poured, sprayed or otherwise distributed from a reservoir in pure form or as a slurry. Optionally other mechanisms can be attached which forces the fuel from the reservoir through a conduit and through inlet 10.

Not shown in FIG. 1 is a casing for containing and/or protecting device 2. The casing is preferably constructed of a material that can withstand the desired operating temperature. Also not shown in FIG. 1 is a housing to isolate the anode from atmospheric oxygen, and this housing can be the same or different as the casing that contains device 2. In these embodiments, a conduit which penetrates the casing and/or housing can be provided for delivering the oxygen-containing flow 7 to cathode 6. The device can further comprise another conduit to release waste products, such as gases or liquids, from the casing and/or housing.

The cathode ionizes oxygen to oxygen ions as represented by the electrochemical half reaction shown in eq. 1:

$$\tfrac{1}{2}O_2 + 2e^- \rightarrow O^{2-} \qquad (1)$$

This ionization occurs when the device operates in battery or fuel cell mode. The cathode can be exposed to air, pure oxygen or any oxygen-containing gas 7, at atmospheric pressures or greater. Alternatively, the device can include an inlet to expose cathode 6 to the oxygen-containing gas 7. Typically, oxygen is reduced at an interface between cathode 6 and the oxygen-containing gas 7. Cathode 6 preferably comprises a material which allows oxygen ions to migrate through cathode 6 and access electrolyte 5.

When the fuel cell operates in battery mode, the anode itself is consumed as represented by the electrochemical half reaction of eq. 2:

$$M \rightarrow M^{n+} + ne^- \qquad (2)$$

where M represents a metal or metal alloy (and accordingly, $M^{n+}$ represents an oxidized metal or alloy), "$e^-$" denotes an electron, and n is greater than or equal to 1, depending on the metal or metal alloy. $M^{n+}$ is typically present as a metal oxide (or mixed metal oxide). As described previously, the portion of the anode that is oxidized, as shown in eq. 2, forms an oxidized portion on or within the anode.

When the device is in fuel cell mode, a variety of reactions can occur. The fuel is oxidized at the anode, thereby releasing electrons, as represented in eq. 3:

$$\tfrac{1}{2}nO^{2-} + \text{fuel} \rightarrow aCO_x + bNO_y + cSO_z + dH_2O + \text{(optionally other oxidation products)} + ne^- \qquad (3)$$

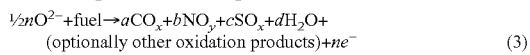

The oxygen anions shown in eq. 3 are, for the most part, supplied by the cathode reaction of eq. (1). Eq. 3 is intended to represent some of the various possible oxidation products. The coefficients a, b, c, d, x, y, and z can be the same or different and each are greater than or equal to zero and their values depend on the type of fuel used, and at least one of a, b, c, d, x, y, and z will be greater than zero. The coefficient "n" is greater than 0. The fuel may comprise a combination of "a" carbon atoms and/or "b" nitrogen atoms and/or "c" sulfur atoms and/or d hydrogen atoms, etc. For example, $CO_x$ can represent $CO_2$, CO or a mixture thereof. If hydrogen is the fuel, water is the sole oxidation product. Not all possible oxidation products are represented by eq. 3 and depending on the composition of the fuel, those of ordinary skill in the art can determine the resulting oxidation product. Thus, a net reaction of the anode in fuel cell mode involves oxidation of the fuel with no consumption of the anode.

Without wishing to be bound by any theory, the recharging of the anode by the fuel is represented by eq. (4).

$$nMO_v + \text{fuel} \rightarrow nM + aCO_x + bNO_y + cSO_z + dH_2O + \text{(optionally other oxidation products)} \qquad (4)$$

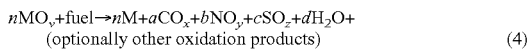

The reaction of eq. (4) is similar to that of eq. (3), except the oxygen anions are provided, at least in part, by the metal or mixed metal oxide, "$MO_v$" where "v" is greater than 0.

In one embodiment, the device is capable of electrical output of at least about 10 mWatt/cm$^2$, preferably at least about 50 mWatt/cm$^2$, preferably at least about 100 mWatt/cm$^2$, even more preferably at least about 200 mWatt/cm$^2$, even more preferably at least about 300 mWatt/cm$^2$, and even more preferably at least about 500 mWatt/cm$^2$.

In one embodiment, the cathode is a solid state cathode. Examples of solid state cathodes include a metal oxide and a mixed metal oxide. Specific examples include tin-doped In$_2$O$_3$, aluminum-doped zinc oxide and zirconium-doped zinc oxide. Another example of a solid state cathode is a perovskite-type oxide having a general structure of ABO$_3$, where "A" and "B" represent two cation sites in a cubic crystal lattice. A specific example of a perovskite-type oxide has a structure La$_x$Mn$_y$A$_a$B$_b$C$_c$O$_d$ where A is an alkaline earth metal, B is selected from the group consisting of scandium, yttrium and a lanthanide metal, C is selected from the group consisting of titanium, vanadium, chromium, iron, cobalt, nickel, copper, zinc, zirconium, hafnium, aluminum and antimony, x is from 0 to about 1.05, y is from 0 to about 1, a is from 0 to about 0.5, b is from 0 to about 0.5, c is from 0 to about 0.5 and d is between about 1 and about 5, and at least one of x, y, a, b and c is greater than zero. More specific examples of perovskite-type oxides include LaMnO$_3$, La$_{0.84}$Sr$_{0.16}$MnO$_3$, La$_{0.84}$Ca$_{0.16}$MnO$_3$, La$_{0.84}$Ba$_{0.16}$MnO$_3$, La$_{0.65}$Sr$_{0.35}$Mn$_{0.8}$CO$_{0.2}$O$_3$, La$_{0.79}$Sr$_{0.16}$Mn$_{0.85}$CO$_{0.15}$O$_3$, La$_{0.84}$Sr$_{0.16}$Mn$_{0.8}$Ni$_{0.2}$O$_3$, La$_{0.84}$Sr$_{0.16}$Mn$_{0.8}$Fe$_{0.2}$O$_3$, La$_{0.84}$Sr$_{0.16}$Mn$_{0.8}$Ce$_{0.2}$O$_3$, La$_{0.84}$Sr$_{0.16}$Mn$_{0.8}$Mg$_{0.2}$O$_3$, La$_{0.84}$Sr$_{0.16}$Mn$_{0.8}$Cr$_{0.2}$O$_3$, La$_{0.6}$Sr$_{0.35}$Mn$_{0.8}$Al$_{0.2}$O$_3$, La$_{0.84}$Sc$_{0.16}$MnO$_3$, La$_{0.84}$Y$_{0.16}$MnO$_3$ La$_{0.7}$Sr$_{0.3}$CoO$_3$, LaCoO$_3$, La$_{0.7}$Sr$_{0.3}$FeO$_3$, and La$_{0.5}$Sr$_{0.5}$CO$_{0.8}$Fe$_{0.2}$O$_3$.

Other examples of solid state cathodes include LaCoO$_3$, LaFeO$_3$, LaCrO$_3$, and a LaMnO$_3$-based perovskite oxide cathode, such as La$_{0.75}$Sr$_{0.25}$CrO$_3$, (La$_{0.6}$Sr$_{0.4}$)$_{0.9}$CrO$_3$, La$_{0.6}$Sr$_{0.4}$FeO$_3$, La$_{0.6}$Sr$_{0.4}$CoO$_3$ or Ln$_{0.6}$Sr$_{0.4}$CoO$_3$, where Ln can be any one of La, Pr, Nd, Sm, or Gd.

Alternatively, the cathode can comprise a metal. Exemplary metal cathodes include platinum, palladium, gold, silver, copper, rhodium and combinations thereof.

The electrolyte allows conduction of ions between the cathode and anode. The electrolyte allows migration of oxygen ions from the cathode to the anode. In one embodiment, the electrolyte is a solid state electrolyte. Example solid state electrolytes include a metal oxide and mixed metal oxides.

An example of a solid state electrolyte is an electrolyte having a formula (ZrO$_2$)(HfO$_2$)$_a$(TiO$_2$)$_b$(Al$_2$O$_3$)$_c$(Y$_2$O$_3$)$_d$ (M$_x$O$_y$)$_e$ where a is from 0 to about 0.2, b is from 0 to about 0.5 c is from 0 to about 0.5, d is from 0 to about 0.5, x is greater than 0 and less than or equal to 2, y is greater than 0 and less than or equal to 3, e is from 0 to about 0.5, and M is selected from the group consisting of calcium, magnesium, manganese, iron, cobalt, nickel, copper, and zinc. More specifically, examples of solid state electrolytes include (ZrO$_2$), (ZrO$_2$)(Y$_2$O$_3$)$_{0.08}$, (ZrO$_2$)(HfO$_2$)$_{0.02}$(Y$_2$O$_3$)$_{0.08}$, (ZrO$_2$)(HfO$_2$)$_{0.02}$(Y$_2$O$_3$)$_{0.05}$, (ZrO$_2$)(HfO$_2$)$_{0.02}$(Y$_2$O$_3$)$_{0.08}$(TiO$_2$)$_{0.10}$, (ZrO$_2$)(HfO$_2$)$_{0.02}$(Y$_2$O$_3$)$_{0.08}$(Al$_2$O$_3$)$_{0.10}$, (ZrO$_2$)(Y$_2$O$_3$)$_{0.08}$(Fe$_2$O$_3$)$_{0.05}$, (ZrO$_2$)(Y$_2$O$_3$)$_{0.08}$(CoO)$_{0.05}$, (ZrO$_2$)(Y$_2$O$_3$)$_{0.08}$(ZnO)$_{0.05}$, (ZrO$_2$)(Y$_2$O$_3$)$_{0.08}$(NiO)$_{0.05}$, (ZrO$_2$)(Y$_2$O$_3$)$_{0.08}$(CuO)$_{0.05}$, (ZrO$_2$)(Y$_2$O$_3$)$_{0.08}$(MnO)$_{0.05}$ and ZrO$_2$CaO.

Other examples of solid state electrolytes include a CeO$_2$-based perovskite, such as Ce$_{0.9}$Gd$_{0.1}$O$_2$ or Ce$_{1-x}$Gd$_x$O$_2$ where x is no more than about 0.5; lanthanum-doped ceria, such as (CeO)$_{1-n}$(LaO$_5$)$_n$ where n is from about 0.01 to about 0.2; a LaGaO$_3$-based perovskite oxide, such as La$_{1-x}$A$_x$Ga$_{1-y}$B$_y$O$_3$ where A can be Sr or Ca, B can be Mg, Fe, Co and x is from about 0.1 to about 0.5 and y is from about 0.1 to about 0.5 (e.g. La$_{0.9}$Sr0$_{0.1}$Ga$_{0.8}$Mg$_{0.2}$O$_3$); a PrGaO$_3$-based perovskite oxide electrolyte, such as Pr$_{0.93}$Sr$_{0.07}$Ga$_{0.85}$Mg$_{0.15}$O$_3$ or Pr$_{0.93}$Ca$_{0.07}$G a$_{0.85}$Mg$_{0.15}$O$_3$; and a Ba$_2$In$_2$O$_5$-based perovskite oxide electrolyte, such as Ba$_2$(In$_{1-x}$Ga$_x$)$_2$O$_5$ or (Ba$_{1-x}$La$_x$)In$_2$O$_5$, where is x is from about 0.2 to about 0.5.

In one embodiment, the electrochemical device is a solid-state device which comprises solid-state cathode and electrolyte components as described previously. Preferably, the anode is a liquid as described previously.

In one embodiment, the device provides an electrolyte having small thicknesses. A small thickness provides at least one of many advantageous features: (1) efficient migration of ions; (2) provision of the oxygen-containing gas at relatively low pressures; and (3) facile design of miniature devices. In one embodiment, the electrolyte has a thickness of less than about 200 µm, and more preferably less than about 100 µm.

FIG. 1 shows a cross-section of a device in which each component can be provided as a flat layer or a shaped layer. For example, FIG. 1 can also represent a cross-section of a shaped device such as a tubular device. By "shaped device" it is meant that the electrode-electrolyte configuration can be provided as any shape besides a flat layer, as known to those of ordinary skill in the art.

FIG. 2 shows a schematic cross-section of one type of shaped layer, i.e. tubular device 12. Device 12 of FIG. 2 has similar components as device 2 of FIG. 1. In FIG. 2, anode 14 is centrally positioned within and enclosed by electrolyte 15. Encircling electrolyte 15 is cathode layer 16. Leads 18a and 18b contact anode 14 and cathode 16 respectively. Inlet 20, for introducing gaseous or liquid fuels if applicable, is shown submersed in the anode but can be positioned anywhere that allows the fuel to be exposable to anode 14. Optionally, cathode layer 16 can be positioned within a casing to protect cathode layer 16 from breakage, as cathode layer 16 is typically provided as a thin layer. The casing may be sufficiently porous to allow oxygen to access cathode layer 16. Alternatively, device 12 can further comprise one or more conduits (not shown) to provide an oxygen-containing gas flow 17 to the cathode, or for removing exhaust from the device.

Another aspect of the present invention provides a housing for the anode comprising a solid-state electrolyte material. This feature provides an efficient design for an electrochemical device as the solid-state electrolyte serves two functions: (1) as a medium for the transport of ions to and from the electrodes; and (2) for containing a liquid anode. Design efficiency is advantageous, particularly when stacks of electrochemical devices are employed. In this aspect, a separate housing is eliminating, thus reducing cost of materials and resulting in a more lightweight device. The electrolyte housing can be constructed solely of electrolyte material, or partially of electrolyte material. Ideally, the housing should comprise enough electrolyte material to span a dimension of the anode, such as in FIG. 2 (electrolyte makes up essentially the entire housing) or FIGS. 3 and 4 (electrolyte makes up wall 25 only). Of course, the electrolyte material can be of any dimension, depending on the electrical output and/or economic requirements. Generally, efficient device design results from maximizing the surface area which provides ionic communication between the electrode/electrolyte components.

Alternatively, the housing can comprise a mixture of electrolyte and non-electrolyte materials. Preferred non-electrolyte materials in this mixture have thermal expansion coefficients substantially similar to the electrolyte material. In one embodiment, the thermal expansion coefficients of the electrolyte and non-electrolyte materials differ by less than about 30% at a temperature of less than about 1500° C., to preferably less than about 20% and more preferably less than about 10%. Example non-electrolyte materials that can be included in this mixture include $\alpha$-$Al_2O_3$.

Figure 3:
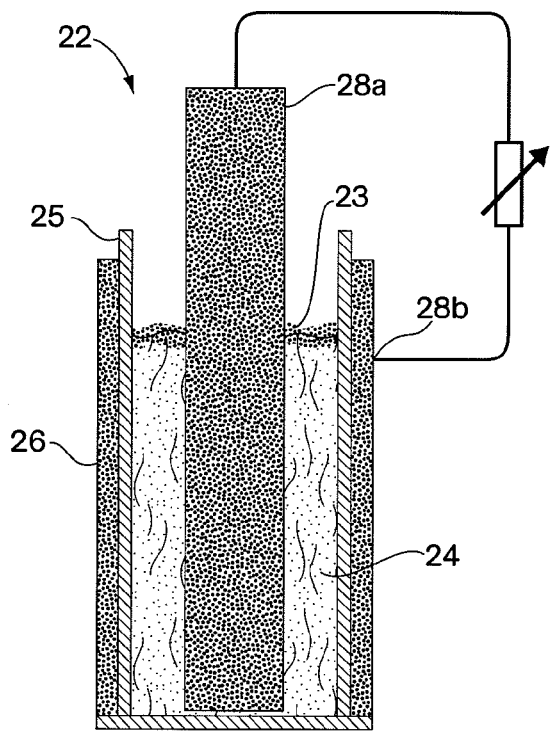
FIG. 3 shows a cross-sectional schematic diagram of a tubular device of the present invention, highlighting the positioning of solid fuel positioned on the anode.

In one embodiment, an electrolyte housing is surrounded and in ionic communication with a cathode material. In this embodiment, the cathode conforms to the shape of the electrolyte, or at least to the dimension of the electrolyte which spans a dimension of the anode. FIG. 2 shows cathode 16 in conforming contact with electrolyte 15 which also functions as a housing for the anode. FIG. 3 shows another embodiment, where cathode 26 only surrounds the walls of electrolyte 25, leaving base 29 free of contact with cathode material.

Another advantageous feature of a liquid anode in certain embodiments involves the ability of the anode to act as a sealant precursor to seal a flaw in the device. In this embodiment, the device is "self-repairing", and does not require any active human intervention for the repair. For example, when a solid state electrolyte develops a crack or other flaw, a liquid metal anode can flow to substantially cover and/or substantially fill the crack. Subsequently, the anode can react with oxygen to form a metal oxide (or mixed metal oxide in the case where the anode is an alloy). The resulting oxide formed substantially conforms to the crack due to the flow properties of the initially liquid anode. Even though the present device minimizes thermal and mechanical stresses due to the liquid properties of the anode, the self-repairing capability helps to ensure the integrity of the device, particularly when repair is not feasible, e.g. during operation of the system.

Figure 4:
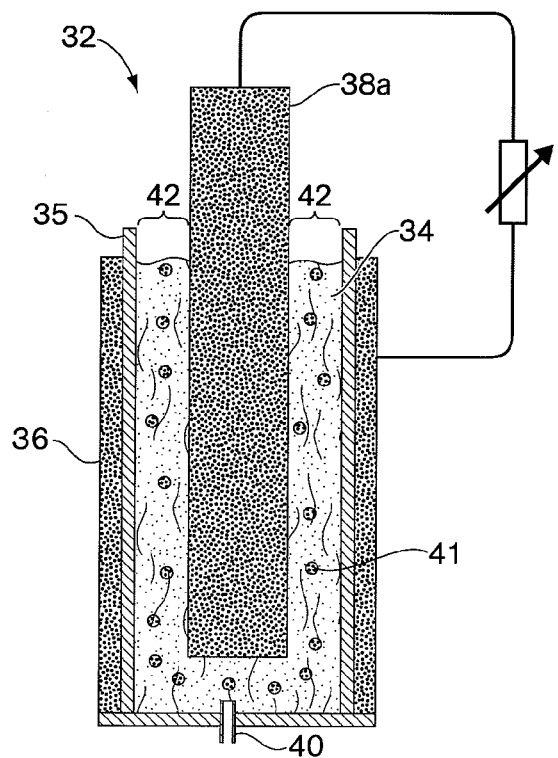
FIG. 4 shows a cross-sectional schematic diagram of a tubular device of the present invention, highlighting the positioning of an inlet positioned on one end of the anode, allowing exhaust to exit the other end of the anode.

FIGS. 3 and 4 display various methods of exposing an anode to a source of fuel. FIG. 3 shows a cross-sectional schematic diagram of a tubular device 22 having electrolyte 25 in ionic communication with anode 24 and cathode 26. Base 29 can be of the same material as electrolyte 25, or of a different material and the connection between electrolyte 25 and base 29 can be integral or non-integral. Lead 28a (which can comprise a graphite material) is submersed in anode 24 and is electrically connected to lead 28b which is in electronic communication with cathode 26. Fuel 23 is shown positioned on top of anode 24 and can either be consumed in this manner or can be dispersed throughout the anode. This arrangement is useful in the situation where the fuel is not easily transferred from an inlet, such as in the case of certain solid fuels. Optionally, the device can further comprise a mechanism for urging fuel 23 towards the anode as fuel 23 is consumed. An urging mechanism allows maximum contact surface area between fuel 23 and anode 24. Examples of urging mechanisms include various mechanical devices, such as a spring, a clamp, a rod or a diaphragm, or other urging mechanisms known to those of ordinary skill in the art. Mixing or agitation can also accomplish the urging.

FIG. 4 shows a cross-sectional schematic diagram of tubular device 32, featuring another position of inlet 40 with respect to device 32. Device 32 comprises electrolyte 35 in ionic communication with anode 34 and cathode 36. Base 39 can be of the same or a different material as electrolyte 35 and the connection between electrolyte 35 and base 39 can be integral or non-integral. Lead 38a is partially submersed in anode 34 and does not extend all the way to base 39. Inlet 40 penetrates through base 39 to the extent that a space exists between inlet 40 and lead 38a. Upon release of fuel 41 into anode 34 through inlet 40, the fuel can be readily dispersed throughout a maximum portion of anode 34. Another advantage to this arrangement is that any waste products will naturally travel to an aperture opposite, or at a distance from inlet 40, for example, areas 42 in which anode 34 contacts the atmosphere. Alternatively, the device of the present invention can further comprise an exhaust conduit to remove any waste from the device.

Certain prior art devices require operating temperatures of greater than 1000° C. It is generally desired to lower these operating temperatures to minimize thermal energy provided to the device. Exceedingly high temperatures may also lead to electrolyte or cathode cracking or the formation of other flaws in the device. In addition, rapid start-up heating times provides an advantage in the situation where electrical power is required quickly. The higher the operating temperature, however, the greater the time needed for start-up heating of the device.

Thus, another aspect of the present invention provides an electrochemical device comprising an anode comprising a liquid at a temperature of no more than about 1000° C. The ability to provide a liquid anode at lower operating temperatures, such as a temperature below 1000° C., reduces a temperature range required for start-up heating. In addition to reducing start-up heating times, lower temperatures afford a more hospitable environment for maintaining the integrity of an interface between different components such as the anode/electrolyte or electrolyte/cathode components.

Another aspect of the present invention provides an electrochemical device comprising an anode and an intermittent fuel source deliverable to the anode to produce a continuous electrical output from the device. "Intermittent fuel source" refers to any fuel source arranged to allow cessation between a period of delivery of the fuel to the anode. In one embodiment, the cessation can be periodic or random. Cessation can be a multiple occurrence or a one-time occurrence. It is a feature of this aspect of the invention that even with this cessation of fuel delivery a continuous electrical output is produced. In one embodiment, an intermittent fuel source can be used when the device is switched from fuel cell mode to battery mode where fuel is not delivered to the anode. When fuel is supplied to the device, electricity can be generated via fuel cell operation. Ceasing delivery of fuel to the anode causes the device to switch to battery mode for continuous generation of electricity. An electrical device can be manufactured, using the methods and materials described herein, to derive power continuously while experiencing minimal or almost no shut down time as the electrical device switches between fuel cell and battery modes. During intermittent fuel delivery, the fuel source can also be changed or replenished.

In one embodiment, switching from fuel cell mode to battery mode and vice versa occurs automatically. For example, the device of the present invention can operate in fuel cell mode until the fuel is exhausted. Automatic switching is demonstrated when the anode begins to oxidize, thereby releasing electrons, i.e., the device automatically operates in battery mode. In one embodiment, the switching can occur by simply shutting off fuel delivery to the anode or turning on the fuel source. Alternatively, a switch can be constructed which stops/starts introduction of fuel to the anode. Other switching mechanisms can be readily envisioned by those of ordinary skill in the art.

In one embodiment, the device can operate simultaneously in fuel cell and battery mode. In this embodiment, fuel consumption and fuel oxidation by the anode occur simultaneously. This may occur when fuel is supplied to the anode at a low flow rate and/or in low amounts. Alternatively, simultaneous fuel cell and battery operation may inherently occur when fuel is supplied to the device. Switching between fuel cell and battery mode can occur, not as a sharp on/off event, but gradually as the amount of fuel supplied to the anode is increased or decreased.

Another aspect of the invention provides an electrochemical device comprising an anode and a source of fuel exposable to the anode. The anode is constructed of a material such that the device is capable of producing electricity by using the anode (the anode is included in a circuit in which the electricity is produced) in both the presence of fuel without anode consumption (or without net anode consumption, i.e., less anode is consumed than regenerated) and in the absence of fuel. In one embodiment, a device "capable of producing electricity involving the anode in the presence of fuel without anode consumption" refers to generation of electricity via fuel cell operation. Conversely, the same anode can deliver electrons to the device without exposure to fuel in which the anode is consumed, such as when the device operates in battery mode. In one embodiment, the electrochemical device is a fuel cell/battery hybrid capable of operating in either fuel cell or battery mode, while producing a continuous electrical output.

Figure 5:
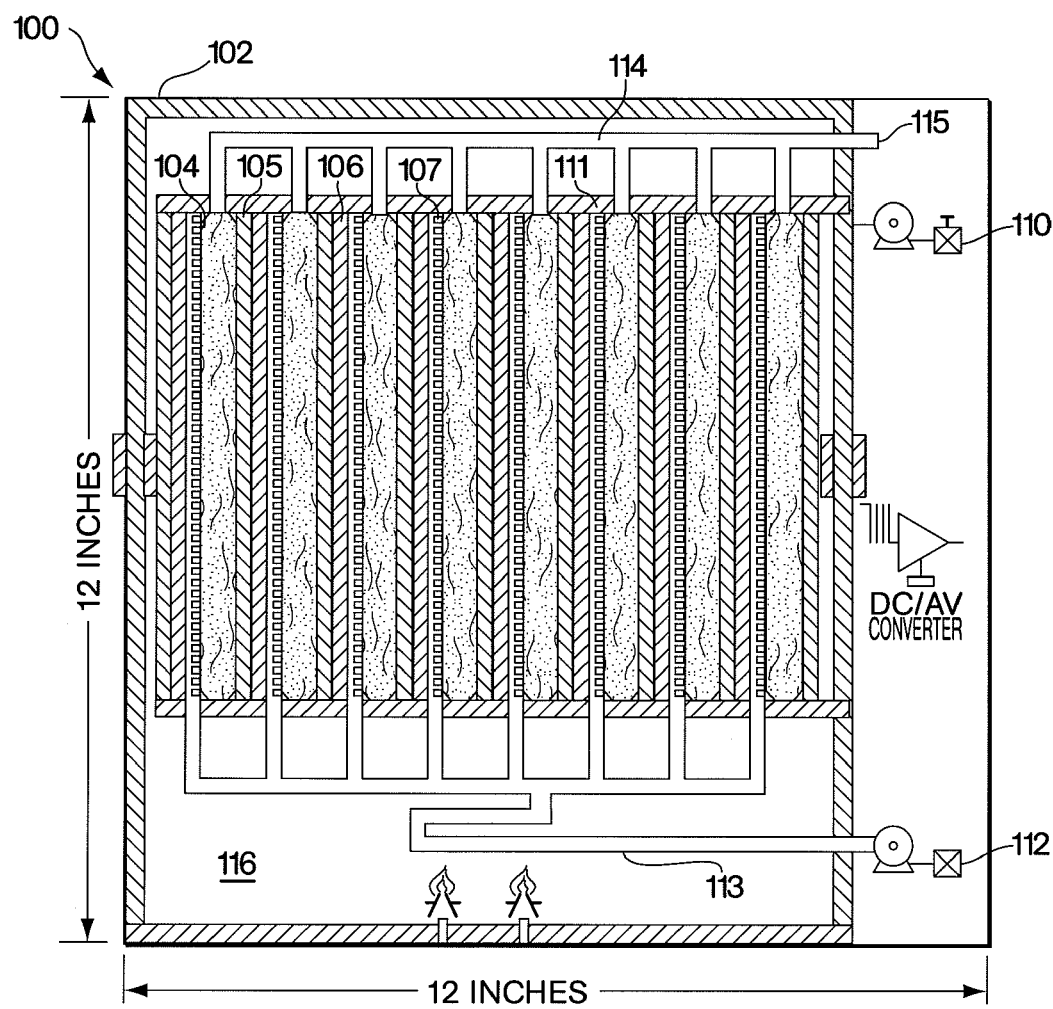
FIG. 5 shows a cross-sectional schematic diagram of a planar stack of the present invention which utilizes liquid or gaseous fuels.

Another aspect of the present invention provides a stack of electrochemical devices. Electrical output can be multiplied by supplying a number of devices as described above into one system. For variable load applications, it is usually desired that the stack be lightweight and capable of miniaturization. FIG. 5 shows an example of a stack 100 of planar electrochemical devices. Each device in stack 100 comprises an anode 104 in ionic communication with electrolyte 105. Electrolyte 105 in turn is in ionic communication with cathode 106. Stack 100 further includes an inlet 110 for liquid or gaseous fuel to be provided to each device via guide 111. Inlet 112 allows oxygen to be supplied via guide 113 to each cathode 106. Conduit 114 and outlet 115 serve to remove any exhaust gases from stack 100. The multi-device system is positioned within casing 102. Stack 100 further includes preheating chamber 116 to heat each device to an operational temperature.

In this aspect, a liquid anode is particularly advantageous due to its moldable properties. The liquid can function as a seal between each device. Moreover, the liquid provides a soft contact between the liquid anode and the adjacent device to reduce mechanical and thermal stresses between the devices.

FIG. 5 shows each device in the stack arranged and positioned in a repeat array to arrange identical components in the same orientation. This arrangement may relieve stresses on each device, particularly taking advantage of the soft contact provided by the anode. A variety of arrangements of the devices in the stack can be envisioned to maximize the number of devices that receive fuel from guide 111.

In other embodiments, the devices in the stack can be arranged in series, parallel or can comprise a series-parallel configuration.

The stack need not necessarily be arranged in planar configuration and can be arranged in any array, e.g. such as a rectangular or hexagonal array.

Another advantageous feature of the liquid anode is that by positioning a liquid adjacent a solid component, a non-permanent seal is formed. This non-permanent attachment removes a need to add further components to hold each device adjacent to each other such as adhesives or mechanical attachments. In one embodiment, the casing can provide a series of slots. Each device can simply be guided through the slots to provide the stack. In the event of a malfunction of an individual device, the malfunctioning device can be removed and easily replaced with a new device. For other prior art devices, when one individual device malfunctions, either the permanent seal would have to be broken to replace the individual device or the entire stack will need to be repaired. Of course, other embodiments may provide a permanent seal in addition, depending on the application.

Figure 6:
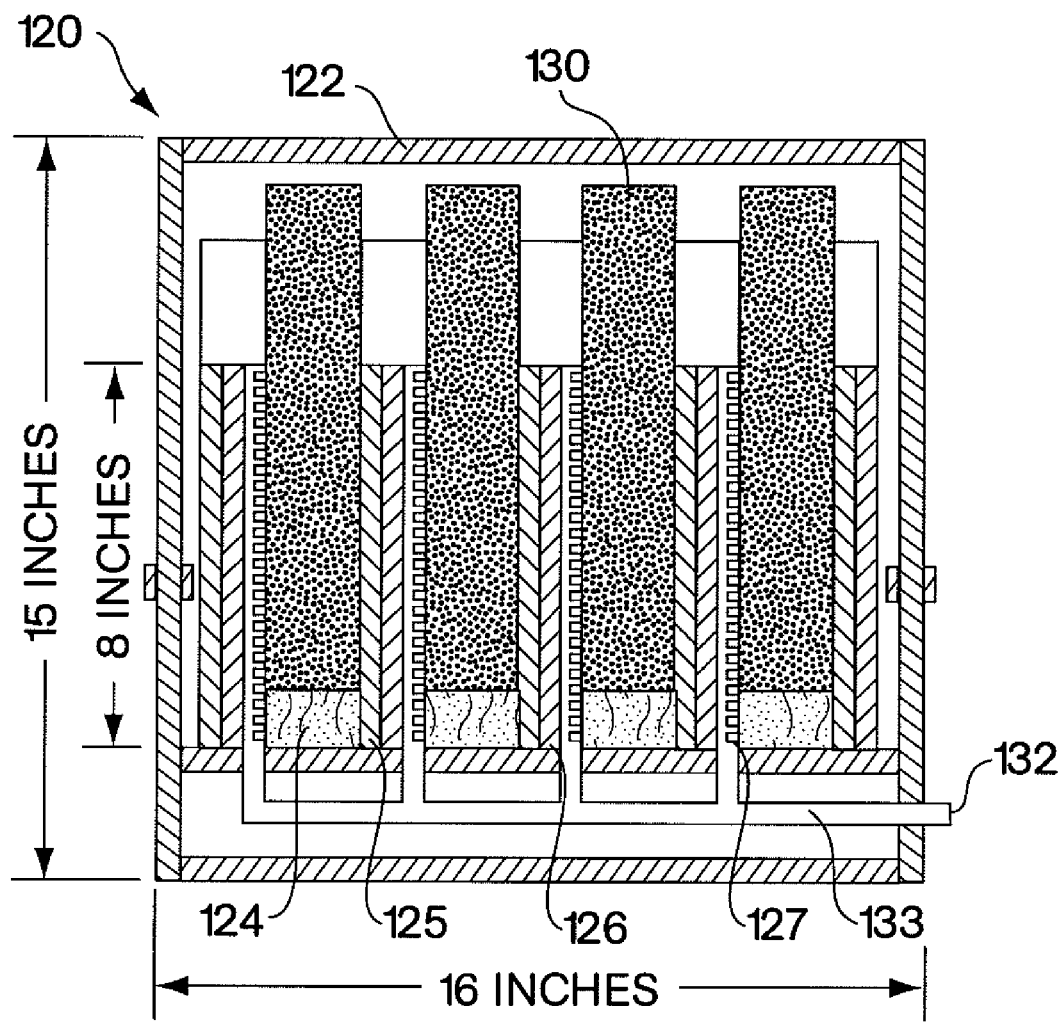
FIG. 6 shows a cross-sectional schematic diagram of a planar stack of the present invention which utilizes solid fuels.

FIG. 6 shows an alternative example of a stack utilizing solid fuel. FIG. 6 shows stack 120 having anode 124 positioned adjacent electrolyte 125 which in turn is positioned adjacent cathode 126. Inlet 132 directs oxygen to individual devices via conduit 133. Solid fuel 130 is positioned within anode 124. Solid fuel 130 can also act as a lead to collect electricity from the anode. Each device can be positioned within casing 122. Casing 122 can further comprise inlets to provide more solid fuel to the device, or a reservoir for additional solid fuel sources. Each device in stack 120 can be tubular or planar.

In one embodiment, the stack can further comprise an interconnect positioned adjacent the anode of a first device and the cathode of the second device. An interconnect has an air flow pattern to allow oxygen flow in or out of the stack. In addition, an interconnect can convey electrical currents and/or thermal energy away from each device. Preferably, the interconnect has sufficient electrical conductivity and thermal conductivity to achieve this function. To reduce the likelihood of forming cracks in the device, it is preferred that the interconnect and cathode have similar thermal coefficients. In one embodiment, respective thermal expansion coefficients of the cathode and interconnect differ by less than about 30% at a temperature of less than about 1500° C., preferably less than about 20% and more preferably less than about 10%. In one embodiment, the interconnect comprises substantially the same material as the cathode, and thus the respective thermal coefficients would theoretically differ by about 0%.

Figure 7:
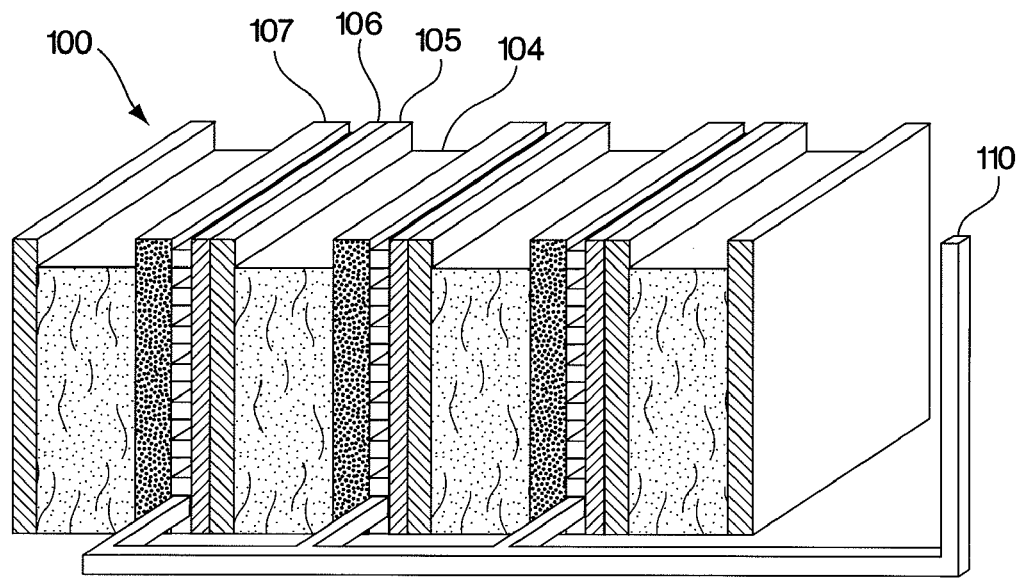
FIG. 7 shows a three-dimensional schematic representation of the planar stack of FIG. 5.

Referring back to FIGS. 5 and 6, interconnects 107 and 127 are shown as being positioned adjacent cathodes 106 and 126, respectively, and the adjacent anodes. FIG. 7 shows a close-up of a stack of FIG. 5. Stack 100 features interconnect 107 positioned adjacent cathode 106. Interconnect 107 is also positioned adjacent an anode.

Figure 8:
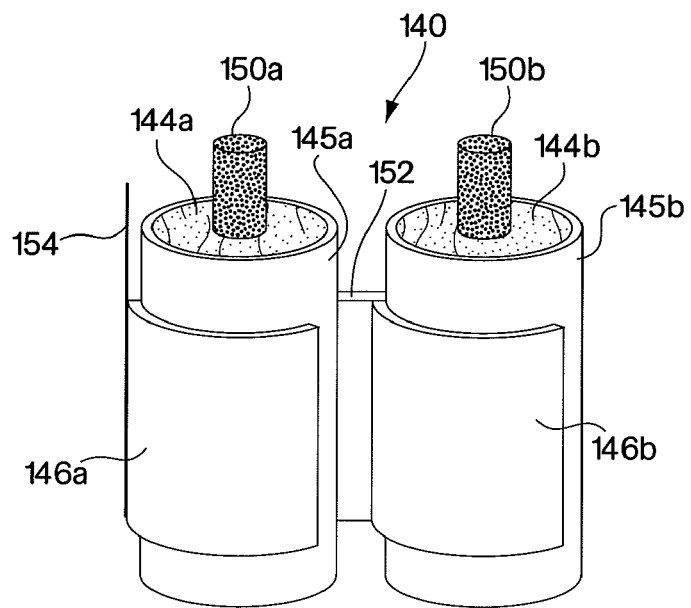
FIG. 8 shows an interconnect positioned between two tubular devices of the present invention.

FIG. 8 shows another exemplary arrangement for connecting two tubular devices of the invention together to form a stack via an interconnect. In FIG. 8, stack 140 comprises individual units each comprising anodes 144a and 144b positioned adjacent and within electrolyte layers 145a and 145b, respectively. Cathodes 146a and 146b are provided as a layer which coats at least a portion of electrolytes 145a and 145b. Fuel sources 150a and 150b can be positioned adjacent anodes 144a and 144b. Where the fuel is a solid fuel, fuel sources 150a and 150b can comprise a solid rod, such as graphite. In addition, the solid rod can also function as a current collector. Alternatively, for liquid, gaseous or solid powder fuels, fuel sources 150a and 150b can comprise an inlet positioned within or near anodes 144a and 144b to guide and disperse the fuels throughout anodes 144a and 144b. In any situation, a lead would be required to be positioned in anode 144b and lead 154 can be positioned adjacent cathode 146a. Interconnect 152 is positioned adjacent electrolyte layer 145a and cathode layer 146b. To allow interconnect 152 to contact anode 144a, holes can be provided in a portion of electrolyte 145a which contacts interconnect 152. Thus, the anode 144a can flow through the holes to eventually contact interconnect 152. FIG. 8 shows tubular arrangements, but those of ordinary skill in the art can readily design an analogous planar device, in light of the description provided herein.

As discussed previously, typical fuel cell interconnects include a gas flow pattern. In one embodiment, an interconnect of the present invention is free of a gas flow pattern, particularly when used with a liquid anode. Because fuel and waste are dispersible throughout the anode and can enter or exit each device via the liquid anode, a gas flow pattern is not essential for the interconnect of the present invention. It is understood that other fuel types may still require an interconnect with a gas flow pattern for enhanced device performance.

As discussed previously, the interconnect is positioned adjacent a liquid anode, thus reducing many problems associated with thermal coefficients mismatches that may arise as the device is heated to high temperatures. Accordingly, it has been discovered that such moldability of the liquid anode allows the interconnect to have much thinner dimensions than many prior art interconnects. This allows interconnects to be more lightweight and less expensive and these benefits can be extended to the manufacturer of the device.

Thus, the interconnect of the present invention can provide at least one of the following advantages: (1) a reduction in weight by at least 20%, preferably by at least 30% and more preferably by at least 40% compared to prior art interconnects; (2) elimination of intricate, machined gas flow patterns, which reduces the cost and manufacture time; and (3) rapid and repeated start-up heating of the stack due to the minimal thermal and mechanical stresses resulting from contact with adjacent anode and cathode materials.

Figure 9:
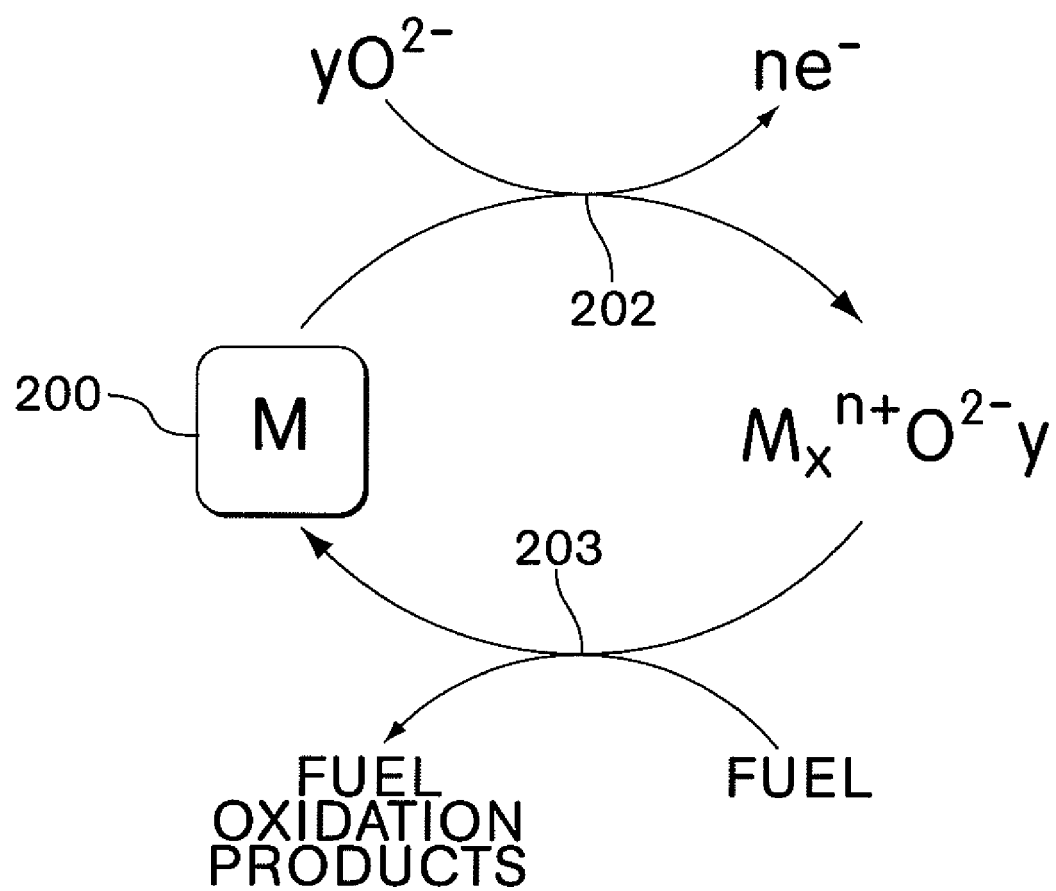
FIG. 9 shows a scheme of the various electrochemical processes that can be carried out by the anode of the present invention within a single device.

FIG. 9 shows a schematic diagram summarizing various electrochemical processes that can be carried out by the anode of the present invention. In FIG. 9, anode 200 is represented as "M" in which anode 200 comprises a metal or metal alloy. Eq. 202 of FIG. 9 schematically represents anode 200 functioning as a battery. In eq. 202, anode 200 combines with "y" moles of $O^{2-}$ produced from a cathode. In battery mode, anode 200 releases electrons resulting in the oxidation of M to form a metal or mixed metal oxide, $M_xO_y$. Eq. 203 schematically shows the chemical rechargeability of the anode which, in the presence of fuel, is reduced back to metal anode 200. In eq. 203, it is the metal oxide that combines with the fuel to produce fuel oxidation products. "$M_xO_y$" should be of a sufficient electrochemical potential to be reduced by the fuel. Without wishing to be bound by any theory, the combination of eqs. 202 and 203 schematically illustrates the process undergone by anode 200 when operating in fuel cell mode, in which there is no net consumption of anode. Thus, FIG. 9 shows the capability of anode 200 to: (1) be oxidized in the absence of a fuel and produce electricity, as shown in eq. 202; (2) regenerate from a corresponding metal oxide, as shown in eq. 203; and (3) oxidize fuel with no net consumption of the anode, as represented by eqs. 202 and 203.

Accordingly, another aspect of the present invention provides a method for energy conversion. The method involves providing an electrochemical device comprising an anode, such as any anode described herein. The method also involves causing electricity to be produced when the anode is exposed to a fuel, such that electricity is produced without anode consumption (i.e. anode acts as a catalyst). In one embodiment, this step is exemplified by eqs. 202 and 203 of FIG. 9. The method also involves causing electricity to be produced in the device in the absence of fuel provided to the anode. This step is distinguished from other devices which provide a back-up battery source having another anode, in the event the fuel supply is exhausted. The present invention allows the same anode to cause electricity to be produced in the presence of a fuel (i.e., when in fuel cell mode) and to cause electricity to be produced in the absence of the fuel. In one embodiment, this step is exemplified by eq. 202 of FIG. 9.

In one embodiment, either step of causing electricity to be produced in the presence or absence of a fuel involves providing an electrolyte in ionic communication with the anode and a cathode in ionic communication with the electrolyte. These steps can also involve directing an oxygen-containing gas flow to the cathode. In one embodiment, the causing steps can also include heating the device from a temperature of about 300° C. to about 1500° C., or within other temperature ranges as described previously. Preferably, the chosen temperature range involves producing the anode in a liquid state.

In the embodiment where electricity is produced in the absence of the fuel, the anode is typically consumed. Thus, in one embodiment, the method further comprises providing fuel to the anode to chemically recharge the anode. In one embodiment, this step is exemplified by eq. 203 of FIG. 9.

Another aspect of the present invention provides a method for energy conversion. The method involves providing an anode and delivering a fuel to the anode intermittently while producing a continuous electrical output by using the anode. As described previously, "intermittently" can involve any cessation of fuel delivery to the anode. "Producing a continuous electrical output by using the anode" refers to use of the anode continuously, even though fuel is provided to the anode intermittently.

A device comprising a fuel cell and a separate battery back-up is excluded from this aspect of the invention, because when fuel is supplied, the anode of the fuel cell is used to produce electricity. When fuel delivery ceases in favor of the battery backup, the anode of the battery and not the anode of the fuel cell, is used to produce electricity. Thus, the anode of the fuel cell is not used continuously in the continuous production of electricity.

Another aspect of the present invention provides a method involving providing an anode and causing a portion of the anode to be oxidized such that electricity is produced. In one embodiment, this causing step occurs when the anode is operated as a battery, as exemplified by eq. 202 of FIG. 9. The "portion of the anode" is described as follows. Initially, the portion of the anode that is immediately adjacent the electrolyte is oxidized, as this portion represents the shortest diffusion pathway by which oxygen ions released by the cathode can access the anode. As device operation continues, this oxidized portion grows from the anode/electrolyte interface toward the bulk of the anode, as the anode continues to be consumed.

At any stage of anode consumption, either initially or when the entire anode has been consumed (i.e. at least a portion of the anode is consumed), the method involves exposing the oxidized portion of the anode to a chemical reductant such that the oxidized portion is reduced. In one embodiment, reducing this oxidized portion regenerates the anode to its initial state. In one embodiment, the anode is a metal which is oxidized to a metal oxide, and exposure of the metal oxide to a chemical reductant results in re-formation of the metal anode or to an oxidation state capable of oxidizing the fuel. In one embodiment, the chemical reductant is a fuel. This is advantageous in that the device does not require any new materials as the fuel available is capable of reducing the oxidized portion of the anode to the initial state of the anode.

In one embodiment, the reduced portion, which results from reducing the oxidize portion, is capable of functioning as an anode again. "Functioning as an anode" involves either the operation of the anode as a battery or a fuel cell.

Another aspect of the invention provides a method for energy conversion, comprising the step of providing a device comprising a liquid metal anode. A portion of the anode is oxidized to form a metal oxide concurrent with the generation of electricity in the device. The anode can be oxidized by heating the device to any of the preferred operable temperatures disclosed herein when exposed to oxygen anions. Alternatively, the oxidized anode can be reduced by exposing the anode to a fuel, preferably at the temperatures disclosed herein.

The function and advantage of these and other embodiments of the present invention will be more fully understood from the examples below. The following examples are intended to illustrate the benefits of the present invention, but do not exemplify the full scope of the invention.

Example 1

An Electrochemical Device

A single electrochemical device, as exemplified by FIG. 2, is constructed as follows. Tubular electrolyte 15 is made of YSZ (yttria-stabilized zirconia, $(ZrO_2)(HfO_2)_{0.02}(Y_2O_3)_{0.08}$) and has a thickness of 180 µm. Tubular cathode 16 is made of LSM ($La_{0.84}Sr_{0.16}MnO_3$) and has a thickness of 300 µm. A platinum wire functions as a cathode current collector (lead 18b), and a graphite rod functions as an anode current collector (lead 18a). The tube has a length of 3 cm, a diameter of 1 cm. The anode comprised either 8 g antimony; antimony alloy with 5% lead; indium; lead; antimony alloy with 10% tin; antimony alloy with 5% silver; antimony alloy with 50% indium; tin; or tin alloy with 5% Pb. The device is placed on a heating block with a temperature control.

Example 2

Propane Gas and Natural Gas as Fuel for Recharging

To demonstrate that a device of the present invention can be operated without the addition of fuel, the device of Example 1 was heated and maintained at 960° C. The device registered an open circuit voltage of 0.78V and a short current of 1.5 amp. After operating for 30 min., there was no visible decrease in the power output. After a time from 2-8 h, the current dropped to zero and the open circuit voltage was 0.3-0.6 V.

Propane gas (Bernzomatic) or natural gas was introduced through an alpha-alumina tube (outside diameter 1.2 mm and inside 0.8 mm) into the liquid metallic anode. The end of the tube was submerged beneath the surface of the liquid at a gas flow rate of 50 mL/min.

After charging the device for 2 min with propane gas, the short circuit current increased from zero to 0.3 amp and the open circuit voltage measured 0.79. After a 7 minute charge, the device registered a current of 1.2 amp and a voltage of 0.76 V. Exhaust gas started to show some smoke or carbon soot. With an additional 2 min charge, the current reached 1.5 amp and voltage 0.76 V. The amount of light smoke was another indication of the degree of charge. More charge did not change the current and voltage.

Delivery of propane gas was ceased and the device continued to run for a time greater than 1 h until it was exhausted. The device was then recharged with propane gas as described in this Example. This cycle was repeated for three days without noticeable change of power output.

Example 3

Diesel, Gasoline and Alcohol (Denatured) as Fuel for Recharging

The device of Example 1 was heated and maintained at 990° C. without the addition of fuel. After the cell was exhausted (current was zero and open circuit voltage was 0.3-0.6V), 5 µL of gasoline was injected through a microsyringe into the liquid metallic anode. A total of 5 injections was made within 5 min at a rate of 5 µL/min. Gray smoke was observed during each injection. After recharging with gasoline, the cell gave a current of 2.0 amp (from zero) and voltage of 0.75 V.

To demonstrate the ability of the device to operate with different fuels, the cell was then heated and maintained at 990° C. After the cell was exhausted (current was zero and open circuit voltage was 0.3-0.6V), 2 µL of denatured alcohol was injected through a microsyringe into the liquid anode. A total of 40 injections were made in 13 minutes at a rate of 6.2 µL/min. Little smoke was observed during each injection. After recharging with alcohol, the cell gave a current of 0.3 to 0.5 amp and voltage of 0.72 V.

The cell was then heated and maintained at 990° C. After the cell was exhausted (current was zero and open circuit voltage was 0.3-0.6V), 4 µL of diesel was injected through a microsyringe up to the surface of the liquid metallic anode. A total of 20 injections were made within 20 minutes at a rate of 4 µL per minute. Heavy smoke was observed during each injection. After recharging with diesel, the cell gave a current of 0.3 to 0.5 amp and voltage of 0.72 V.

Example 4

Carbon Black as Fuel for Recharging

This Example demonstrates the ability of the device of the present invention to operate with a solid fuel. The device of Example 1 was heated and maintained at 980° C. After the cell was exhausted (current was zero and open circuit voltage was 0.3-0.6V), carbon grains (size 0.3-0.6 cm) were added inside the cell. After recharging with 0.1 g of carbon, the cell gave a current of 0.3 to 0.5 amp and voltage of 0.72 V. After recharging with 0.1 g more carbon, the cell gave a current of 0.5-1.0 amp and voltage of 0.763. After recharging with 0.21 gram more carbon, the cell gave a current of 1.1 to 1.3 amp and voltage of 0.79 to 0.87 volt. After recharging with 0.17 gram more carbon, the cell gave a current of 1.5 amp and 0.9 to 0.92 V.

Example 5

Weight Analysis for Multi-Unit Stack for Liquid Fuel

FIG. 5 shows exemplary dimensions of a stack of the present invention. Table 1 lists a weight for each component of the stack. Weights of liquid fuels such as gasoline, kerosene and diesel are based on a power density of 4 kW/m$^2$. Fuel and tank are not included.

TABLE 1

| Component | Dimension and size | Weight, lb |
|---|---|---|
| Ceramic electrolyte | 25,000 × 0.01 cm$^3$ (250 cm$^3$) | 3.3 |
| Ceramic cathode | 25,000 × 0.015 cm$^3$ (375 cm$^3$) | 5.0 |
| Ceramic interconnect | 3,500 cm$^3$ (1,500 cm$^3$) | 46 |
| Liquid metallic anodic | 3,750 cm$^3$ (2,500 cm$^3$) | 50 |
| Air delivery system | | 2 |
| Fuel delivery system | | 2 |
| Insulation | | 3 |
| Case & support | | 20 |
| Total Weight | | 131 |

An example stack can comprise a 60-stack of planar electrochemical devices. Each stack can have a size of 8 in. (203 cm)×8 in. (203 cm)=64 in.$^2$ (412 cm$^2$), with a power output of 412 cm$^2$×0.4 watt/cm$^2$=165 watt each. Each stack can have a thickness of 0.4 cm (0.01 cm for the electrolyte, 0.02 cm for the cathode, 0.22 cm for the interconnect and 0.15 cm for the liquid metallic anodic component). In this example, the total stack length is 60×0.4 cm=24 cm (9.5").

The liquid fuel cell is rated at 10 kW (165 watt/stack×60 stacks) with the stack size of 8 in. (203 cm)×8 in. (203 cm)× 9.5 in. (24 cm).

Including insulation (1.5" thickness), Case & Support, air and exhaustive flow conduits, and a preheating, the stack can have a volume of one cubic foot and a weight of 131 lb. This does not include the fuel and a fuel tank.

Example 6

Weight Analysis for Multi-Unit Stack for Solid Fuel

FIG. 6 shows exemplary dimensions of a stack of the present invention for a solid fuel such as carbon. The carbon can be placed inside as part of the device or can be charged from the outside periodically. Table 2 lists a weight for each component of the stack. 46 lb of carbon can be stored inside the device. Of course, the amount of carbon stored inside could be more or less, depending on the mission.

TABLE 2

| Component | Dimension and size | Weight, lb |
| --- | --- | --- |
| Ceramic electrolyte | 25,000 × 0.01 cm$^3$ (250 cm$^3$) | 3.3 |
| Ceramic cathode | 25,000 × 0.015 cm$^3$ (375 cm$^3$) | 5.0 |
| Ceramic interconnect | 3,500 cm$^3$ (1,500 cm$^3$) | 46 |
| Liquid metallic anodic | 3,750 cm$^3$ (2,500 cm$^3$) | 50 |
| Air delivery system | | 2 |
| Carbon plate as fuel | 0.3 cm × 25 cm × 20 cm × 60 | 46 |
| Carbon & liquid guide | | 5 |
| Insulation | | 5 |
| Case & support | | 25 |
| Total Weight | | 187 lb |

An example stack can comprise a 60-stack of planar fuel cell stacks. In this example, each stack has a surface area of 8 in. (203 cm)×8 in. (203 cm)=64 in.$^2$ (412 cm$^2$), with a projected power output of 412 cm$^2$×0.4 watt/cm$^2$=165 watt each. A gap of 0.6 cm between each stack may be longer than that of the liquid fuels (cf. 0.4 cm). Exemplary dimensions: electrolyte=0.01 cm; cathode=0.02 cm; interconnect=0.22 cm; and carbon and liquid anode=0.35 cm. In this example, a total stack length is 60×0.6 cm=36 cm (14").

An additional guide (5 lb) extending out of the stack can be provided for guiding carbon plate and storing excess liquid metals.

The carbon cell is rated at 10 kW (165 watt/stack×60 stacks) and has a dimension of 15"×16"×12" and weighs 187 lb with 46 lb of carbon stored inside as fuel.

With the 46 lb carbon fuel and at 40% fuel efficiency, the unit will produce 73 kW-hours, equivalent to 860 watt-hours/ kilogram.

Increasing carbon fuel load, will improve the energy density. The theoretical limit for carbon is 3,520 watt-hours/ kilogram at 40% fuel efficiency.

Example 7

Analysis of Device Components after Operation

After operating the device of Example 1 as described in Example 2, the device was smashed to allow observation of the internal components. In the interface between the anode and the electrolyte, a yellow powder or white powder was observed. Without wishing to be bound by any theory, it is proposed that this yellow or white powder comprises consumed anode, i.e., a metal oxide such as antimony oxide or a mixed antimony/lead, antimony/tin, antimony/silver, tin and antimony/indium oxide. Interestingly, in the anode/electrolyte interface immediately adjacent the fuel source, no powder was observed. It is believed that the absence of powder in this portion of the cell provides evidence that the fuel is capable of reducing any metal oxide back to the metal.

Those skilled in the art would readily appreciate that all parameters listed herein are meant to be examples and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed:

1. An electrochemical device comprising:
a battery comprising an anode;
wherein the battery can be converted into a fuel cell by supplying, to the anode, a fuel comprising a material different from the anode, the anode comprising a liquid comprising tin during operation of the electrochemical device.

2. The device of claim 1, wherein the anode is chemically rechargeable.

3. A method for energy conversion, comprising:
providing a battery; and
supplying a fuel to an anode in the battery, the fuel being of a different material than the anode, wherein the anode comprises a liquid comprising tin during operation of the battery.

4. The method of claim 3, wherein the step of supplying the fuel to the anode causes the battery to switch to a fuel cell.

5. A method for energy conversion, comprising:
providing a fuel cell; and
switching the fuel cell to a battery by ceasing a supply of a fuel to an anode in the fuel cell, the anode comprising a liquid comprising tin during operation of the battery.

6. The device of claim 1, wherein the anode consists essentially of tin.

7. The device of claim 1, wherein the battery produces electricity in the absence of fuel by oxidizing the anode and the battery produces electricity in the presence of fuel without anode consumption.

8. The device of claim 1, wherein the fuel comprises a carbonaceous fuel.

9. The device of claim 3, wherein the battery is capable of producing electricity in the absence of fuel by oxidizing the anode.

10. The device of claim 3, wherein, in the presence of supplied fuel, the battery produces electricity without anode consumption.

11. The device of claim 3, wherein exposure of the anode to the fuel causes the anode to be chemically recharged.

12. The device of claim 3, wherein the anode consists essentially of tin.

13. The device of claim 3, wherein the fuel comprises a carbonaceous fuel.

14. The device of claim 5, wherein the anode consists essentially of tin.

* * * * *